US011998933B2

(12) United States Patent
Heubrock et al.

(10) Patent No.: US 11,998,933 B2

(45) Date of Patent: Jun. 4, 2024

(54) SANITARY SHOWER COMPRISING A JET FORMER WITH AT LEAST ONE DUCKBILL VALVE

(71) Applicant: Grohe AG, Hemer (DE)

(72) Inventors: Dominik Heubrock, Ascheberg (DE); David Mainka, Iserlohn (DE)

(73) Assignee: GROHE AG, Hemer (DE)

( * ) Notice: Subject to any disclaimer, the term of this patent is extended or adjusted under 35 U.S.C. 154(b) by 414 days.

(21) Appl. No.: 17/437,134

(22) PCT Filed: Feb. 28, 2020

(86) PCT No.: PCT/EP2020/055298

§ 371 (c)(1),
(2) Date: Sep. 8, 2021

(87) PCT Pub. No.: WO2020/182492

PCT Pub. Date: Sep. 17, 2020

(65) Prior Publication Data

US 2022/0168757 A1 Jun. 2, 2022

(30) Foreign Application Priority Data

Mar. 8, 2019 (DE) ......................... 102019105974.7

(51) Int. Cl.
*B05B 1/18* (2006.01)
*B05B 1/30* (2006.01)

(52) U.S. Cl.
CPC ............ *B05B 1/185* (2013.01); *B05B 1/3006* (2013.01)

(58) Field of Classification Search
CPC ........... B05B 1/044; B05B 1/18; B05B 1/185; B05B 1/3006; B05B 1/32; B05B 1/323; B05B 11/007; B05B 15/528; Y10S 239/12
(Continued)

(56) References Cited

U.S. PATENT DOCUMENTS 5,228,625 A * 7/1993 Grassberger .......... B05B 15/528 239/602
5,405,089 A * 4/1995 Heimann .......... B29C 45/14344 239/533.13
(Continued)

FOREIGN PATENT DOCUMENTS

DE 3107808 A * 9/1982 ............. B05B 1/185
EP 1375007 A1 * 1/2004 ............. B05B 1/185
(Continued)

OTHER PUBLICATIONS

International Search Report dated May 7, 2020 in International (PCT) Application No. PCT/EP2020/055298, with English language translation.

*Primary Examiner* — Darren W Gorman
(74) *Attorney, Agent, or Firm* — WENDEROTH, LIND & PONACK, L.L.P.

(57) ABSTRACT

The invention relates to a sanitary shower (1) comprising at least a housing (2), at least one fluid inlet (3) for a fluid, and at least one jet-forming element (4) with at least one fluid channel (19), the at least one fluid channel (19) comprising at least one duckbill valve (6) having an elastic valve casing (7) that runs in a flow direction (8) of the fluid from a valve base (9) to a slotted valve outlet (10). The valve casing (7), at least in the region of the slotted valve outlet (10), has an outwardly oriented thicker portion (12).

11 Claims, 4 Drawing Sheets

(58) Field of Classification Search
USPC ...... 239/533.13, 533.14, 546, 568, 597, 602
See application file for complete search history.

(56) References Cited

U.S. PATENT DOCUMENTS

| | | | | |
|---|---|---|---|---|
| 5,730,361 | A * | 3/1998 | Thonnes | B05B 15/528 239/602 |
| 7,721,979 | B2 * | 5/2010 | Mazzola | B05B 1/18 239/602 |
| 9,435,108 | B2 * | 9/2016 | Zhou | E03C 1/08 |
| 2001/0010342 | A1 * | 8/2001 | Allmendinger | B05B 15/40 239/525 |
| 2003/0062426 | A1 * | 4/2003 | Gregory | B05B 15/528 239/533.13 |
| 2018/0099295 | A1 * | 4/2018 | Armbruster | B05B 1/185 |
| 2019/0224697 | A1 * | 7/2019 | Butzke | B05B 15/528 |
| 2019/0344301 | A1 | 11/2019 | Zabari | |

FOREIGN PATENT DOCUMENTS

| | | |
|---|---|---|
| WO | 2014/014029 | 1/2014 |
| WO | 2018/116291 | 6/2018 |

* cited by examiner

SANITARY SHOWER COMPRISING A JET FORMER WITH AT LEAST ONE DUCKBILL VALVE

The present invention relates to a sanitary shower. Such sanitary showers can be used for showers and bathtubs, which are used in particular for personal hygiene.

Showers or bathtubs regularly have an overhead shower that directs a spray from above onto a user of the shower during showering, and/or a hand shower the user can guide by hand during showering. Further, sanitary showers for showers or bathtubs, which can be used to dispense a fluid in different spray patterns, for instance in the form of rain spray, full-body spray, massage spray or pearl spray are known. The changeover between the individual spray patterns can be made, for instance, via manually and/or electrically actuated changeover elements, for instance in the form of valves or solenoid valves, at the sanitary showers. The changeover elements can be used to direct the fluid to the appropriate jet-forming element to form the desired spray patterns. To control or change a desired spray pattern, control elements may be provided to permit a user of the sanitary shower to set the desired spray pattern. When the sanitary shower is used to turn off a fluid discharge, an undesired dripping of fluid from the sanitary shower may occur. To prevent this dripping, sanitary showers having outlet nozzles in the form of so-called duckbill valves are known. A duckbill valve is a valve that has a valve jacket shaped like a duckbill. Such valves are also known as "duckbill valves". The valve jacket is at least partially made of rubber or a synthetic elastomer, such as silicone, and includes a valve base through which fluid can flow into the duckbill valve. The valve jacket tapers in a direction of the flow of fluid to a slit-shaped valve outlet. The slit-shaped valve outlet is closed when the sanitary shower is not in use. When an inflow of the fluid is activated, for instance by opening an inflow valve in an inflow line of the sanitary shower, the slit-shaped valve outlet opens owing to an elastic deformation of the valve jacket as a result of the fluid pressure, allowing the fluid to pass through the duckbill valve.

After closing the inflow valve of the sanitary shower, the slit-shaped valve outlet closes automatically as a result of the decreasing fluid pressure, preventing the fluid from dripping. The disadvantage of duckbill valves is that they can calcify after prolonged use of the sanitary shower and then no longer fully close. In addition, particularly thin-walled duckbill valves no longer close completely after just a few uses. Then the sanitary shower tends to drip despite the design of duckbill valves.

It is therefore the object of the invention to solve at least some of the issues described with reference to the prior art and, in particular, of providing a sanitary shower, in which the dripping of fluid is reduced or completely prevented.

These objects are met by a sanitary shower according to the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A sanitary shower having at least the components listed below contributes to meeting the objective:

- a housing,
- at least one fluid inlet for a fluid, and
- at least one jet-forming element jet-forming element having at least one fluid duct, wherein the at least one fluid duct comprises at least one duckbill valve having an elastic valve jacket, which extends in a direction of flow of the fluid from a valve base to a slit-shaped valve outlet, and wherein the valve jacket comprises a thickening directed outwards at least in the area of the slit-shaped valve outlet.

The sanitary shower can be used in particular for a shower or bathtub. Such showers or bathtubs can be used by a user, in particular, for the purpose of personal hygiene or therapeutic application. For this purpose, the shower or bathtub is regularly located in a sanitary facility, such as a bathroom. Furthermore, the shower or bathtub can also be used in facilities having bathing/swimming equipment, such as saunas, whirlpools, swimming pools and so on. For instance, the sanitary shower is an overhead shower or hand shower. The sanitary shower is used to dispense a fluid, in particular water. For this purpose, the sanitary shower has a housing that can, for instance, be made at least partially of plastic and/or metal, for instance stainless steel or brass. The fluid can be supplied to the sanitary shower via at least one fluid inlet. For this purpose, the sanitary shower can be connected to at least one rigid or flexible inflow line or inflow pipe via the at least one fluid inflow. For this purpose, the at least one fluid inlet can be designed, for instance, having a thread or a bayonet lock. The fluid can be dispensed through the sanitary shower in at least one spray pattern. In particular, the fluid can be delivered by the sanitary shower in a plurality of spray patterns, for instance, in two to four spray patterns. The spray patterns can be, for instance, rain spray, full-body spray, massage spray and or pearl spray. In particular, when the sanitary shower is used, the fluid can be dispensed either in a single spray pattern or simultaneously in two different spray patterns. To change the spray pattern, the sanitary shower can have at least one valve in at least one fluid duct, by means of which the fluid can be directed to at least one jet-forming element for the desired spray pattern. In particular, the at least one fluid duct extends through the housing and connects the at least one fluid inlet to the at least one spray plate. Further, the fluid duct may also extend, for instance, through the jet-forming element and/or through a nozzle of the jet-forming element to an outlet opening of the sanitary shower. The sanitary shower can have one jet-forming element per spray pattern.

The jet-forming element can have at least one nozzle and/or at least one outlet opening for the fluid, which can be used to form at least one spray pattern of the fluid specific to the individual spray pattern. Alternately, the sanitary shower may comprise one (single) jet-forming element having at least one nozzle and/or at least one outlet opening for every spray pattern, wherein the at least one nozzle and/or the at least one outlet opening differ for the different spray patterns, for instance with respect to their geometry. In that case, the fluid can be (selectively) directed through the at least one valve to the at least one nozzle and/or the at least one outlet opening for the desired spray pattern. The at least one valve is in particular a manually or electrically actuated valve, for instance in the form of a solenoid valve.

The at least one fluid duct has at least one duckbill valve having an elastic valve jacket. In particular, at least one duckbill valve is assigned to every outlet opening of the sanitary shower, such that every outlet opening can be closed by at least one duckbill valve. In particular, however, the outlet ports and/or nozzles are not formed from the at least one duckbill valve. The at least one duckbill valve is instead preferably located in the sanitary shower, in the at least one spray plate, and/or in the at least one nozzle of the sanitary shower. Further, at least one duckbill valve may be disposed in each nozzle of the sanitary shower. The elastic valve jacket is at least partially made of rubber or a synthetic elastomer, such as silicone. Further, the valve jacket extends in a direction of the flow of fluid from a valve base to a slit-shaped valve outlet. The slit-shaped valve outlet extends orthogonally to the direction of flow, in particular straight and/or in particular not cross-shaped. The at least one duckbill valve may have a valve length of, for instance, 1 mm (millimeter) to 5 mm, preferably (mainly) 2 mm, in the direction of flow from the valve base to the valve outlet or from the valve base to a bill tip. In particular, the valve base has an inner diameter of 1 mm to 3 mm, preferably 1.5 to 1.6 mm. Furthermore, the valve base can be tubular or hose-shaped and/or a flow cross-section inside the elastic valve jacket can taper further in the direction of flow from the valve base to the slit-shaped valve outlet.

Thus, the valve jacket can be funnel-shaped on the inside in the direction of flow. In particular, the at least one duckbill valve is attached to an inner wall of the at least one fluid duct via its valve base.

Further, the at least one duckbill valve may be integrally formed with the at least one fluid duct or the at least one jet-forming element, for instance in the manner of an injection molded part. The slit-shaped valve outlet is located at the bill tip of the duckbill valve and is closed when no fluid flows towards the sanitary shower. When the sanitary shower is used, the fluid pressure building up in the at least one fluid duct opens the slit-shaped valve outlet by elastically deforming the valve jacket.

When the use of the sanitary shower is terminated such that fluid no longer flows to the sanitary shower and/or the at least one fluid duct, the slit-shaped valve outlet closes automatically due to the decreasing fluid pressure. At least in the area of the slit-shaped valve outlet, the valve jacket has a thickening directed outwards. In this context, directed outwards means in particular that the thickening is formed on an outer surface of the elastic valve jacket. The thickening supports the automatic closing of the slit-shaped valve outlet by reinforcing the restoring force of the elastic valve jacket (only and/or at least) in the area of the slit-shaped valve outlet. This can prevent the at least one duckbill valve from not closing properly in the event of calcification and/or owing to insufficient wall thickness, causing the fluid from the sanitary shower to drip. However, the thickening preferably does not extend along the entire outer surface of the elastic valve jacket. This prevents the at least one fluid valve from not opening or not opening sufficiently at low fluid pressures or, in the case of a plurality of fluid valves, only individual duckbill valves from not opening at low fluid pressures such that the sanitary shower delivers the fluid with an uneven spray pattern. The thickening can extend in the direction of flow, for instance, with a thickening length of 0.2 mm to 1 mm, preferably 0.4 mm to 0.5 mm. Furthermore, the thickening can be formed straight. This means in particular that the thickening that extends in parallel to the slit-shaped valve outlet has at least partially a constant wall thickness.

In this case, the bill tip can also be (essentially) rectangular in shape and/or have a bill thickness of 0.5 mm to 2 mm, preferably (approximately) 0.8 mm. Such a thickening supports the closing of the slit-shaped valve outlet without changing the opening behavior of the slit-shaped valve outlet.

The valve jacket may have a first wall thickness outside the thickened area and a second wall thickness inside the thickened area that is at least 10% greater than the first wall thickness. The first wall thickness and/or the second wall thickness may be dimensioned in particular orthogonally to an inner surface of the valve jacket. Furthermore, the first wall thickness can be 0.1 mm to 0.5 mm, preferably (approximately) 0.2 mm.

The thickening can be formed at least partially convex. In particular, the thickening is at least partially convex when viewed against the direction of flow. This may mean that the second wall thickness is greatest at the center of the slit-shaped valve outlet and decreases outwards in parallel to the slit-shaped valve outlet. Such thickening assists in closing the slit-shaped valve outlet, wherein a higher fluid pressure is required to open the center of the slit-shaped valve outlet than outside the center of the slit-shaped valve outlet.

The thickening can be formed at least partially concave. In particular, the thickening is formed at least partially concave when viewed against the direction of flow. This may mean that the second wall thickness is smallest at the center of the slit-shaped valve outlet and increases outwards in parallel to the slit-shaped valve outlet. Such thickening assists in the closing of the slit-shaped valve outlet, and when the slit-shaped valve outlet opens, the central area of the slit-shaped valve outlet opens faster because less material needs to be displaced or elastically deformed in the central area of the slit-shaped valve outlet.

The thickening may be provided at least partially in form of at least one web. In particular, the at least one web is wall-shaped. The at least one web can be deformed, in particular elastically, when the slit-shaped valve outlet is opened. In this way, the at least one web can support the closing of the slit-shaped valve outlet, in particular through its restoring force. In particular, the at least one duckbill valve includes a first web and a second web. The first web and the second web are located in particular on opposite sides of the valve jacket with respect to the slit-shaped valve outlet. Furthermore, the first web and the second web are aligned, in particular with each other.

The at least one web may extend from the valve base to the slit-shaped valve outlet. In particular, the at least one web may extend from the valve base to the bill tip of the at least one duckbill valve.

The at least one web may extend from an outer surface of the valve jacket to an inner wall of the at least one fluid duct.

The at least one web can have a web width of 0.1 mm to 0.5 mm, preferably the at least one web has a web width of (essentially) 0.2 mm.

The at least one web may be orthogonal to the slit-shaped valve outlet.

The thickening can be at least partially elastically deformed when the slit-shaped valve outlet is opened. Owing to the elastic deformation of the thickening, energy can be stored in the thickening to close the slit-shaped valve outlet.

The invention and the technical environment are explained in more detail below with reference to the Figures. It should be noted that the Figures show a particularly preferred embodiment variant of the invention, but the invention is not limited thereto.

The same reference signs are used for the same components in the Figures. In the Figures, shown in an exemplary and schematic manner:

Figure 1:
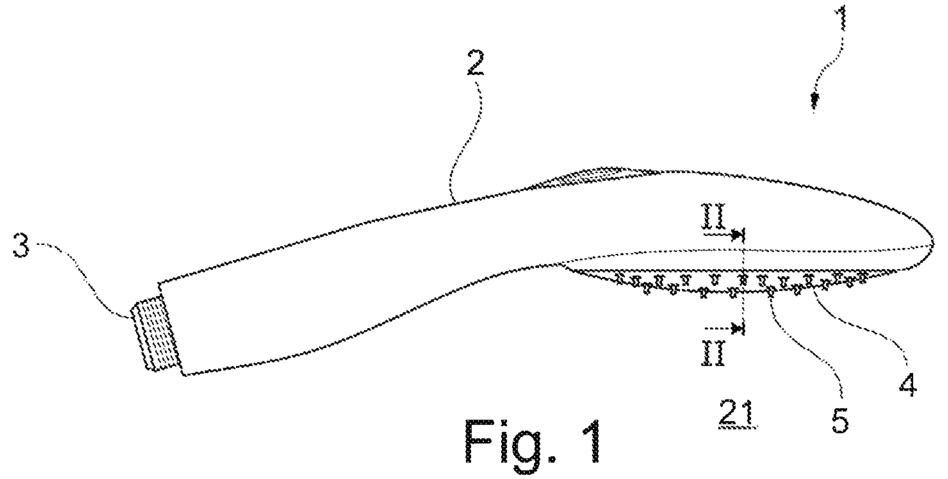
FIG. 1 shows a sanitary shower.

FIG. 1 shows a sanitary shower 1 from a lateral perspective. There the sanitary shower 1 is designed in the form of a hand-held shower and has a housing 2 having a fluid inlet 3. The fluid inlet 3 is used to connect the sanitary shower 1 to a supply hose not shown here.

A fluid can be supplied to the sanitary faucet 1 through the supply hose and enters the housing 2 of the sanitary shower 1 via the fluid inlet 3. Within the housing 2, the fluid can be supplied to a jet-forming element 4 of the sanitary shower 1 via ducts and/or valves not shown here. The jet-forming element 4 has a plurality of nozzles 5 through which, when the sanitary shower 1 is used, the fluid can be delivered to a surrounding area 21 in a desired spray pattern, for instance as rain jets.

Figure 2:
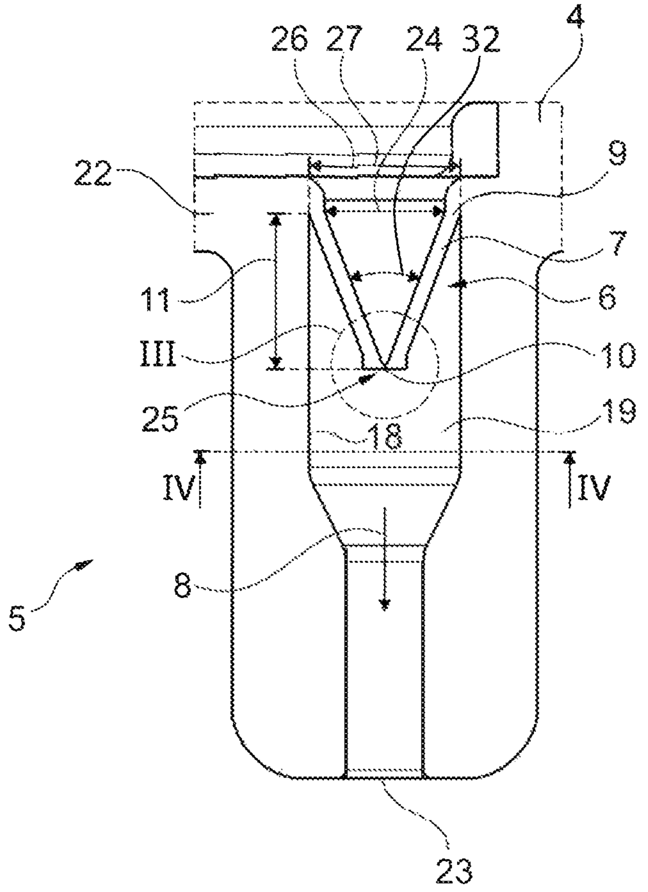
FIG. 2 shows a first sectional view of a first embodiment variant of a duckbill valve of the sanitary shower.

FIG. 2 shows a sectional view of a first embodiment variant of a duckbill valve of a nozzle 5 of the jet-forming element 4 along the sectional line II-II shown in FIG. 1. The nozzle 5 extends vertically downwards from a circular jet-forming element mat 22. Further, the nozzle 5 has a fluid duct 19 extending through the jet-forming element mat 22 to an outlet opening 23. When the sanitary shower 1 is used, the fluid entering the housing 2 of the sanitary shower 1 via the fluid inlet 3 shown in FIG. 1 flows in a direction of flow 8 through the fluid duct 19 and exits from the nozzle 5 to the surrounding area 21 via the outlet opening 23. The duckbill valve 6 is arranged in the fluid duct 19, upstream of the outlet opening 23 in the direction of flow 8. The duckbill valve 6 has an elastic valve jacket 7 extending from a valve base 9 to a slit-shaped valve outlet 10 in the direction of flow 8. The valve jacket 7 is attached to the valve base 9 at an inner wall 18 of the fluid duct 19 and has a valve base diameter 26, which here is (approximately) 1.6 mm. The valve base diameter 26 matches a duct diameter 27 of the fluid duct 19 in the area of the valve base 9. The valve jacket 7 therefore has a circular inner diameter 24 in the area of the valve base 9. Starting from the valve base 9, the valve jacket 7 or the inner diameter 24 of the valve jacket 7 tapers in a funnel shape in the direction of flow 8 up to the slit-shaped valve outlet 10 at a bill tip 25 of the duckbill valve 6 having a taper angle 32, which here is (approximately) 45°. The inner diameter 24 of the valve jacket 7 therefore changes from a circular shape to an oval, (essentially) rectangular or linear shape, starting from the valve base 9 and ending at the slit-shaped valve outlet 10.

The duckbill valve 6 has a valve length 11 from the valve base 9 to the bill tip 25, which is (approximately) 2 mm in this case. When the sanitary faucet 1 is used, the fluid flowing through the fluid duct 19 in the direction of flow 8 into the duckbill valve 6 elastically deforms the valve jacket 7 as a result of the fluid pressure, such that the slit-shaped valve outlet 10 is forced apart and thus opens. After use of the sanitary faucet 1, the slit-shaped valve outlet 10 closes automatically such that the fluid from the outlet opening 23 can be prevented from dripping.

Figure 3:
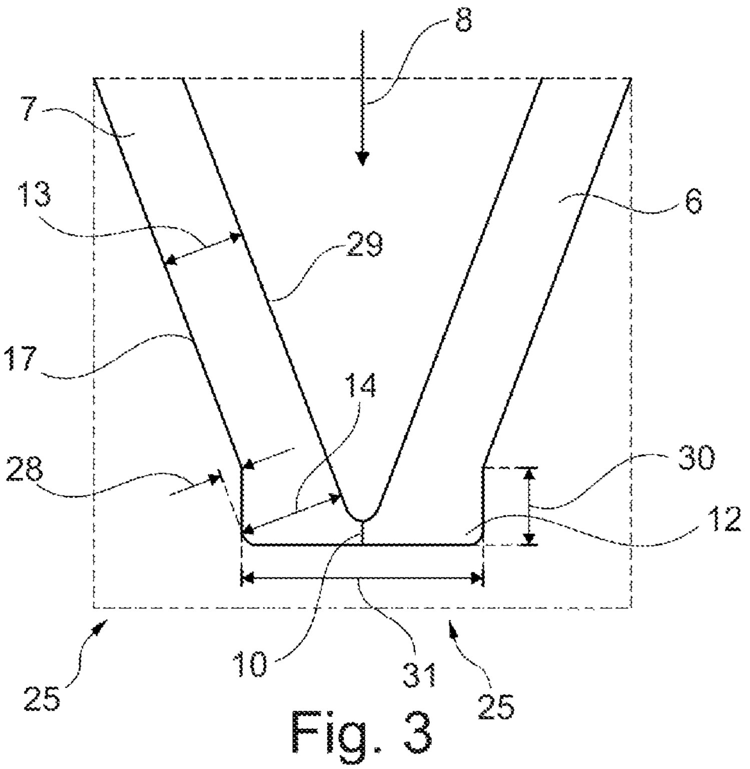
FIG. 3 shows an enlarged detail view of the first embodiment variant of the duckbill valve.

FIG. 3 shows the bill tip 25 of the first embodiment variant of the duckbill valve 6 in the area III shown in FIG. 2. The valve jacket 7 has a thickening directed outwards 12 in the area of the slit-shaped valve outlet 10, i.e. in the area of the bill tip 25. Outside the thickening 12, the valve jacket 7 has a first wall thickness 13 and, in the area of the thickening 12, a second wall thickness 14 that is greater than the first wall thickness 13. The first wall thickness 13 is (approximately) 0.2 mm. The first wall thickness 13 and the second wall thickness 14 extend perpendicular to an inner surface 29 of the valve jacket 7. Starting from an outer surface 17 of the valve jacket 7, the thickening 12 rises to an elevation level 28. The thickening 12 also has a thickening length 30 in the direction of flow 8, which here is (approximately) 0.45 mm. Furthermore, the thickening 12 (perpendicular to the direction of flow 8 and/or perpendicular to the slit-shaped valve outlet 10) results in a bill thickness 31 of the bill tip 25 of the duckbill valve 6, which here is (approximately) 0.8 mm.

Figure 4:
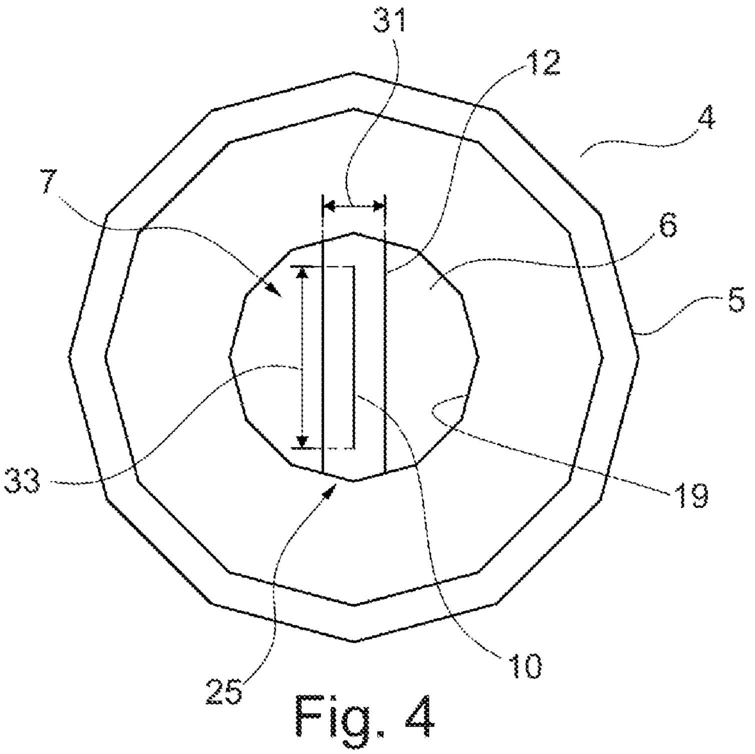
FIG. 4 shows a second sectional view of the first embodiment variant of the duckbill valve.

FIG. 4 shows the nozzle 5 of the jet-forming element 4 along the line of section IV-IV shown in FIG. 2. In particular, this is a top view of the valve jacket 7 of the duckbill valve 6 in the fluid duct 19. In particular, the bill tip 25 of the duckbill valve 6 with the thickening 12 and the slit-shaped valve outlet 10 can be seen there. The slit-shaped valve outlet 10 has an outlet width 33, which here is (approximately) 1.3 mm. The thickening 12 is straight in the first embodiment variant of the duckbill valve 6. This means that the thickening 12 parallel to the slit-shaped valve outlet 10 results in a constant bill thickness 31.

Figure 5:
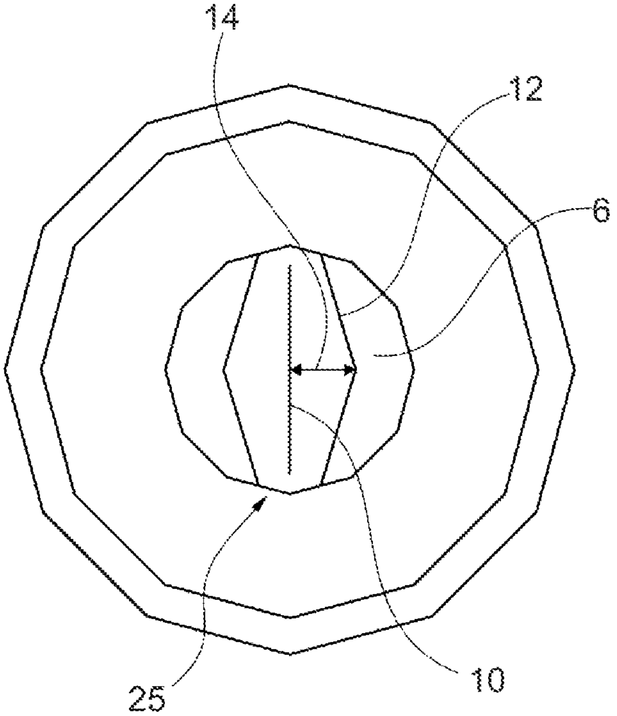
FIG. 5 shows a sectional view of a second embodiment variant of the duckbill valve of the sanitary shower.

FIG. 5 shows a second embodiment variant of a duckbill valve 6 from the same perspective as the first embodiment variant of the duckbill valve 6 shown in FIG. 4. In contrast to the first embodiment variant, the thickening 12 has a convex shape. In particular, this means that the thickening 12 parallel to the slit-shaped valve outlet 10 is not straight, but convex (at least) in the area of the bill tip 25. Therefore, the second wall thickness 14 is greatest at the center of the slit-shaped valve outlet 10 and decreases outwards in parallel to the slit-shaped valve outlet 10. In all other respects, the second embodiment variant of the duckbill valve 6 is configured identically to the first embodiment variant.

Figure 6:
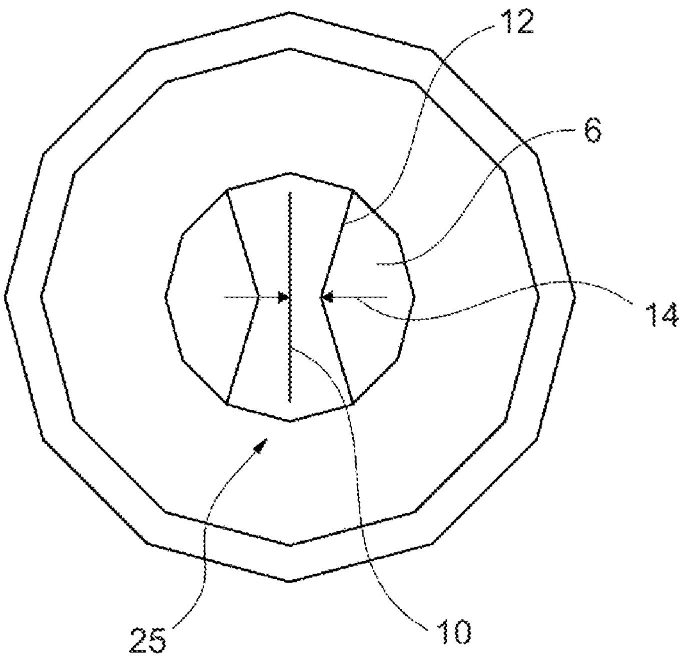
FIG. 6 shows a sectional view of a third embodiment variant of the duckbill valve of the sanitary shower.

FIG. 6 shows a third embodiment variant of a duckbill valve 6 from the same perspective as the first embodiment variant of the duckbill valve 6 shown in FIG. 4. In contrast to the first embodiment variant, the thickening 12 has a concave shape. In particular, this means that the thickening 12 in parallel to the slit-shaped valve outlet 10 is not straight but concave (at least) in the area of the bill tip 25. Therefore, the second wall thickness 14 is smallest at the center of the slit-shaped valve outlet 10 and increases outwards in parallel to the slit-shaped valve outlet 10. In all other respects, the third embodiment variant of the duckbill valve 6 is configured identically to the first embodiment variant.

Figure 7:
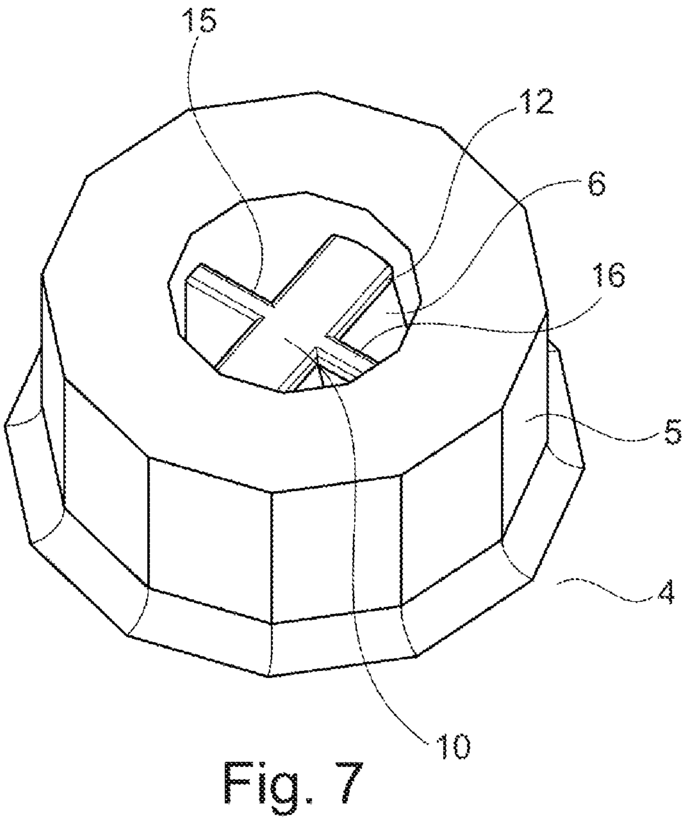
FIG. 7 shows a sectional view in perspective of a fourth embodiment variant of the duckbill valve of the sanitary shower.

FIG. 7 shows a perspective sectional view of a fourth embodiment variant of a duckbill valve 6 along a sectional line IV-IV shown in FIG. 2 through a nozzle 5 of a jet-forming element 4. The fourth embodiment variant of the duckbill valve 6 differs from the first embodiment variant in that the thickening 12 comprises a first web 15 and a second web 16 extending on either side of the valve outlet 10 and orthogonal to the slit-shaped valve outlet 10.

Figure 8:
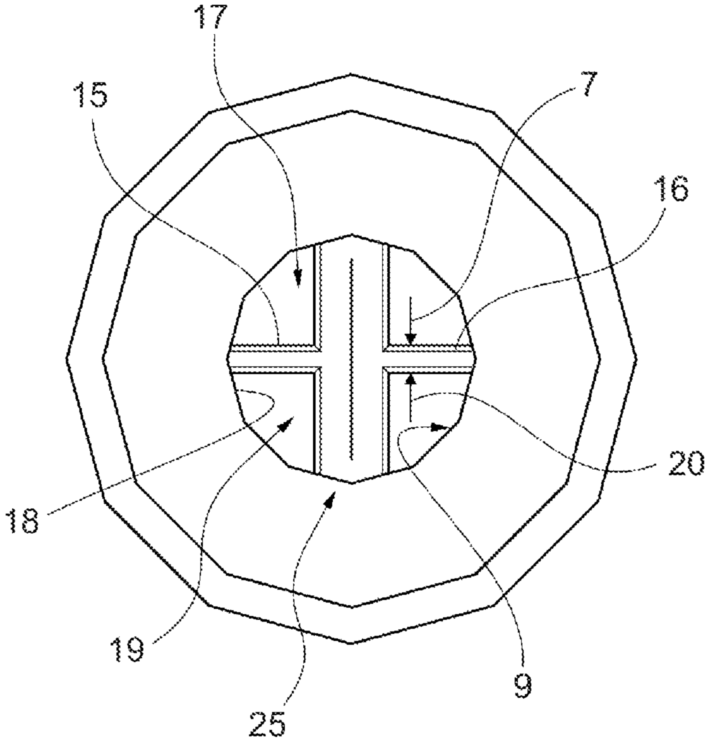
FIG. 8 shows a further sectional view of a fourth embodiment variant of the duckbill valve of the sanitary shower.

FIG. 8 shows a fourth embodiment variant of a duckbill valve 6 from the same perspective as the first embodiment variant of the duckbill valve 6 shown in FIG. 4.

The first web 15 and the second web 16 extend perpendicular to the plane of the drawing from the bill tip 25 to the base 9 of the valve, and in parallel to the plane of the drawing from the outer surface 17 of the valve jacket 7 to the inner wall 18 of the fluid duct 19. Furthermore, the first web 15 and the second web 16 have a web width 20, which here is (approximately) 0.2 mm.

Based on this invention, a fluid dripping from a sanitary shower can be reduced or completely prevented.

LIST OF REFERENCE NUMERALS

1 Sanitary shower
2 Housing
3 Fluid inlet
4 Jet-forming element
5 Nozzle
6 Duckbill valve
7 Valve jacket
8 Direction of flow
9 Valve base
10 Valve outlet
11 Valve length
12 Thickening
13 First wall thickness
14 Second wall thickness
15 First web
16 Second web
17 Outer surface
18 Interior wall
19 Fluid duct
20 Bar width
21 Environment
22 Jet-forming element mat
23 Outlet opening
24 Inner diameter
25 Bill tip
26 Valve base diameter
27 Duct diameter
28 Elevation
29 Inner surface
30 Thickening length
31 Bill thickness
32 Taper angle
33 Outlet width

The invention claimed is:

1. A sanitary shower (1), comprising:

a housing (2), at least one fluid inlet (3) for a fluid, and at least one jet-forming element (4) comprising at least one fluid duct (19) and at least one nozzle (5), wherein the at least one fluid duct (19) comprises at least one duckbill valve (6) having an elastic valve jacket (7), which extends in a direction of flow (8) of the fluid from a valve base (9) to a slit-shaped valve outlet (10), wherein the valve jacket (7) comprises a thickening (12) directed outwards at least in an area of the slit-shaped valve outlet (10), and wherein the valve jacket (7) comprises a first wall thickness (13) outside the thickening (12) and a second wall thickness (14) in an area of the thickening (12) that is at least 10% greater than the first wall thickness (13).

2. The sanitary shower (1) according to claim 1, wherein the thickening (12) is formed at least partially convex.

3. The sanitary shower (1) according to claim 1, wherein the thickening (12) is formed at least partially concave.

4. The sanitary shower (1) according to claim 1, wherein the thickening (12) is formed at least partially in the manner of at least one web (15, 16).

5. The sanitary shower (1) according to claim 4, wherein the at least one web (15, 16) extends from the valve base (9) to the slit-shaped valve outlet (10).

6. The sanitary shower (1) according to claim 4, wherein the at least one web (15, 16) extends from an outer surface (17) of the valve jacket (7) to an inner wall (18) of the at least one fluid duct (19) of the at least one nozzle (5).

7. The sanitary shower (1) according to claim 4, wherein the at least one web (15, 16) has a web width (20) of 0.1 mm to 0.5 mm.

8. The sanitary shower (1) according to claim 4, wherein the at least one web (15,16) extends orthogonally to the slit-shaped valve outlet (10).

9. The sanitary shower (1) according to claim 1, wherein the thickening (12) can be at least partially elastically deformed when the slit-shaped valve outlet (10) is opened.

10. The sanitary shower (1) according to claim 1, wherein the thickening (12) has a length of 0.2 mm to 1 mm.

11. The sanitary shower (1) according to claim 1, wherein the first wall thickness (13) is 0.1 mm to 0.5 mm.

* * * * *